United States Patent [19]
Anderson

[11] Patent Number: 5,924,654
[45] Date of Patent: Jul. 20, 1999

[54] RAILROAD CAR SENSING SYSTEM

[75] Inventor: John D. Anderson, Aurora, Ill.

[73] Assignee: Zeftek, Inc., Montgomery, Ill.

[21] Appl. No.: 08/944,458

[22] Filed: Oct. 6, 1997

[51] Int. Cl.⁶ .................................................. B61L 1/20
[52] U.S. Cl. .................................... 246/169 R; 105/157.1
[58] Field of Search .................... 246/167 R, 169 R,
246/169 D, 191; 105/157.1; 73/514.01,
514.16, 514.25, 514.31, 514.35, 572, 579,
581, 575, 593; 340/669, 683

[56] References Cited

U.S. PATENT DOCUMENTS

| | | |
|---|---|---|
| 3,727,045 | 4/1973 | Warren et al. . |
| 3,790,777 | 2/1974 | Pelino . |
| 3,921,945 | 11/1975 | Swaim ................................ 246/169 R |
| 4,393,957 | 7/1983 | Hawthorne .......................... 105/157.1 |
| 4,471,857 | 9/1984 | Murphy . |
| 4,696,446 | 9/1987 | Mochizuki et al. ................ 246/169 R |
| 5,433,111 | 7/1995 | Hershey et al. .................... 246/169 R |
| 5,622,338 | 4/1997 | Klink .................................. 246/169 R |

*Primary Examiner*—Mark T. Le
*Attorney, Agent, or Firm*—Lloyd L. Zickert

[57] ABSTRACT

A railroad car sensing system for monitoring car performance by detecting vertical, transverse and/or longitudinal car truck movements, which includes one or more accelerometers mounted on a plastic brake beam guide for generating and sensing car truck movement signals to a computer for processing.

14 Claims, 3 Drawing Sheets

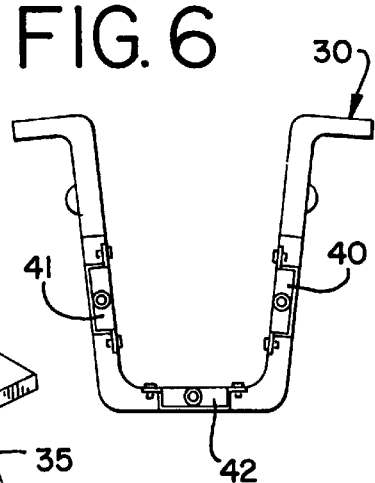
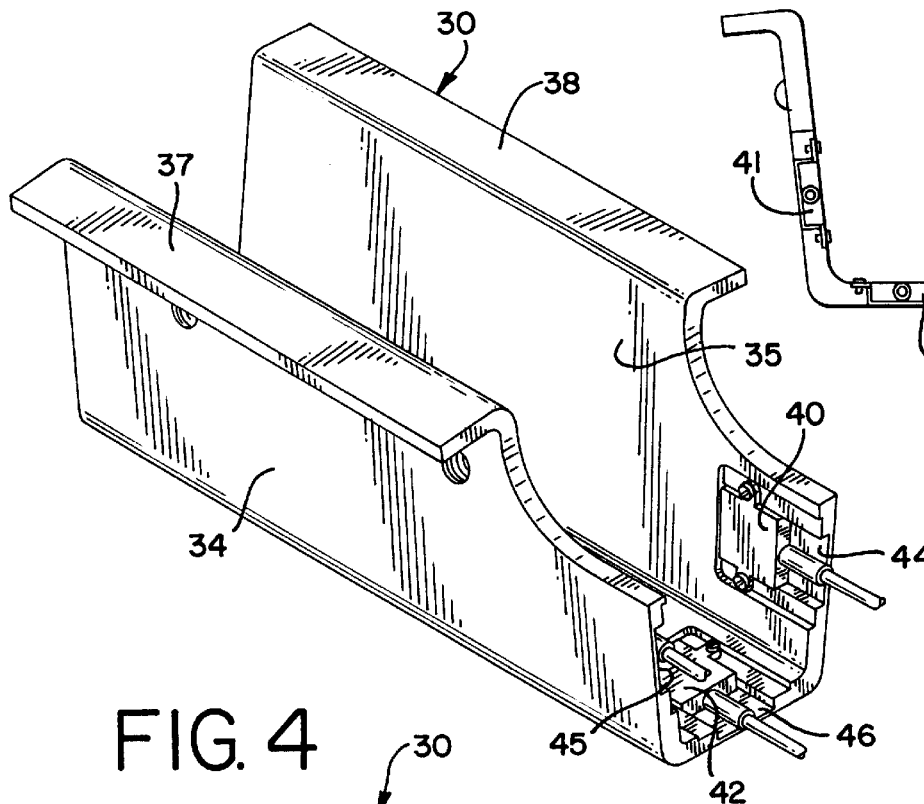
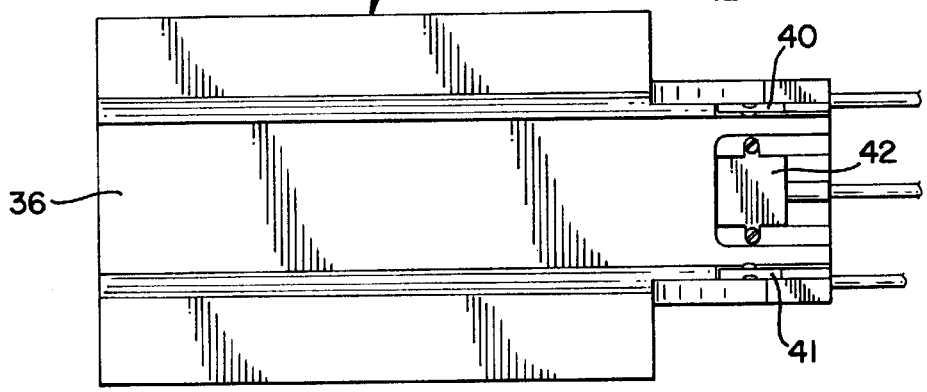
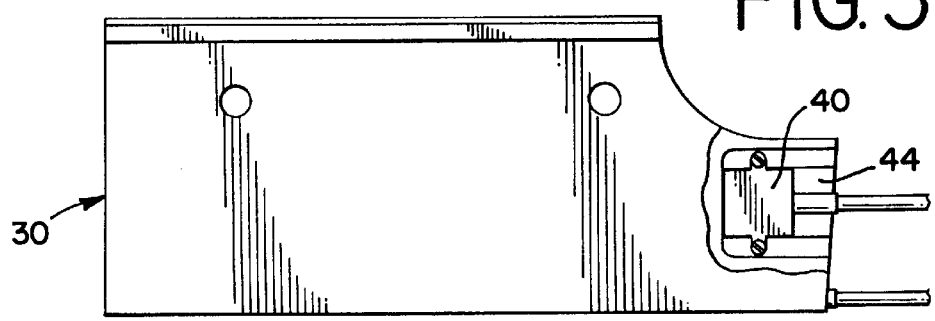

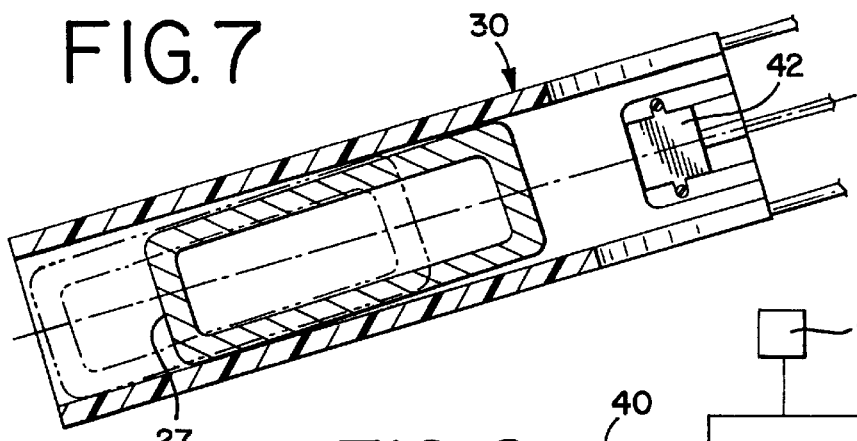
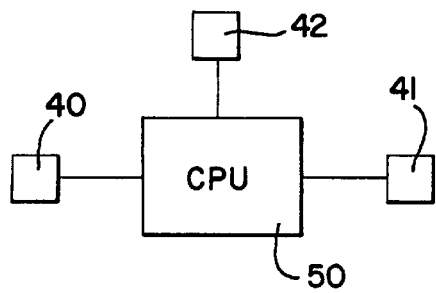
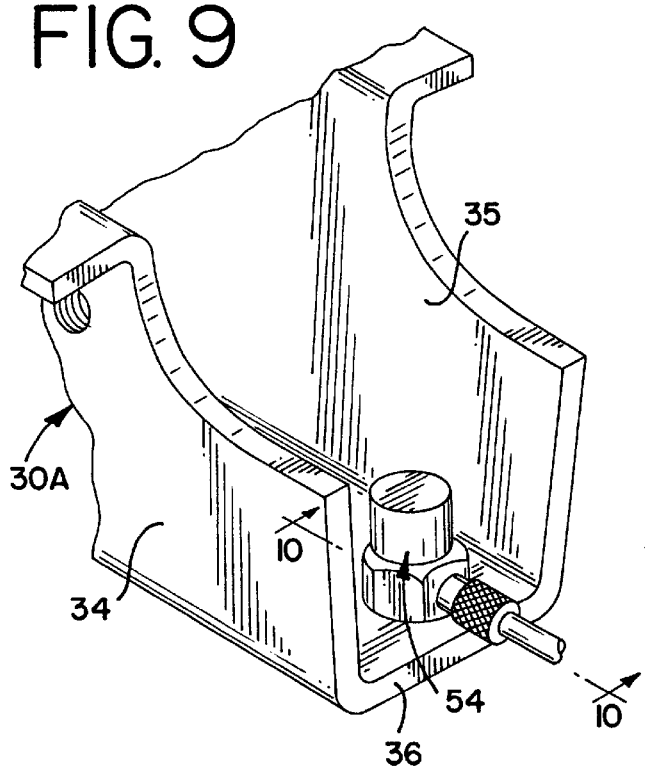
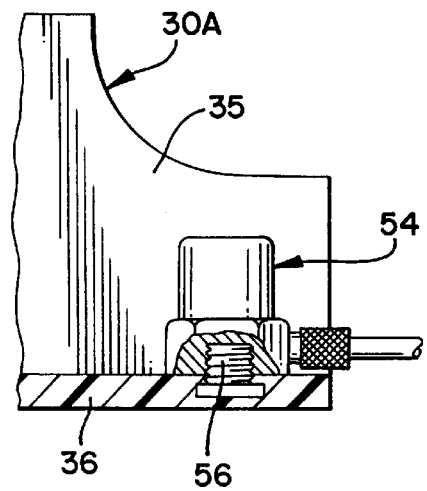
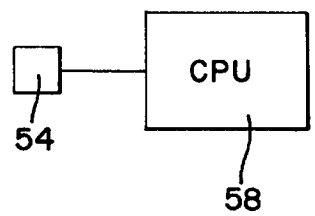

RAILROAD CAR SENSING SYSTEM

DESCRIPTION

This invention relates in general to a system for monitoring movements of a railroad car, and more particularly to a system for detecting vertical, transverse and/or longitudinal movements of one or more trucks for the railroad car.

BACKGROUND OF THE INVENTION

With the advent of electro-pneumatic braking systems for railroad cars, which include a central processing unit or computer on each car, it becomes possible to employ the computer for other uses.

There is no known system capable of determining certain conditions during the operation of a train that would affect the life of a railroad freight car. For example, a slid-flat wheel caused by a braking malfunctioning produces undesirable vibrations of a car which not only affects wear on other parts of a truck of a car but may also affect the integrity of the contents of the car. During train operation such a slid-flat wheel is not detectable except by an observer in a railroad yard. Similarly, a rail defect can cause undue wear on a truck.

It is also well known that longitudinal impacts through humping caused in a switching yard causes undue wear on draft gear and other parts of a car.

Moreover, it is known that truck hunting occurring during train movement, which can involve violent side-to-side movement of a car or truck, can cause severe wear on various parts of the car including the trucks and the draft gear.

SUMMARY OF THE INVENTION

The present invention which monitors car performance and detects vertical, transverse and/or longitudinal movements of a car truck facilitates the correction of undue truck movements, thereby enhancing the life of the railroad car as well as providing greater protection for the contents of the car.

The system of the invention includes one or more sensing devices for producing and sensing movement signals to a computer on a car that can translate those movements into useful information for correcting problems to enhance the life of the railroad car and also protect car contents. The system employs sensing means in the form of accelerometers mounted on brake beam wear plates carried on side frames of a truck which are unsprung parts of the car. These sensing devices are connected to the computer on the car. For example, sensing vertical movements of the truck will indicate a slid-flat wheel or rail defects. Once indicated, maintenance can correct that problem. Further, by detecting lateral forces or side-to-side movement by sending signals to a computer and recording time and speed of truck hunting occurrences, a signal may be relayed to the locomotive for the engineer to take appropriate action in the running of the train and eliminating the hunting phenomena. For example, the engineer might slow down the train a couple of miles per hour which would be sufficient to eliminate the truck hunting and thereby reduce wear on various parts of the car including the trucks and the draft gear. This would enhance the overall life of the car and reduce maintenance costs.

Longitudinal impact movements of the car can be detected during humping a train in a train yard.

DESCRIPTION OF THE DRAWINGS

FIG. 3 is a perspective view of a brake beam wear plate having sensing devices mounted at one end;

FIG. 4 is a top plan view of the brake beam wear plate of FIG. 3;

FIG. 5 is a side elevational view of the wear plate of FIG. 3 and also partly cut away to show the sensing device;

FIG. 6 is an end elevational view of the wear plate of FIG. 3 looking at the end where the sensing devices are mounted;

FIG. 7 is a greatly enlarged view of a brake beam wear plate in section and a brake beam lug received in the wear plate together with a sensing device at one end of the wear plate;

FIG. 8 is a diagrammatic view of the system of the invention showing the sensing devices as being connected to the computer;

FIG. 9 is a greatly enlarged fragmentary view of a brake beam wear plate and showing a modification of the invention where the sensing device is capable of sensing movements along multiple axes;

FIG. 10 is a detailed sectional view generally taken along line 10—10 of FIG. 9; and FIG. 11 is a diagrammatic view of the system utilizing the sensing device of FIGS. 9 and 10.

DESCRIPTION OF THE INVENTION

Figure 1:
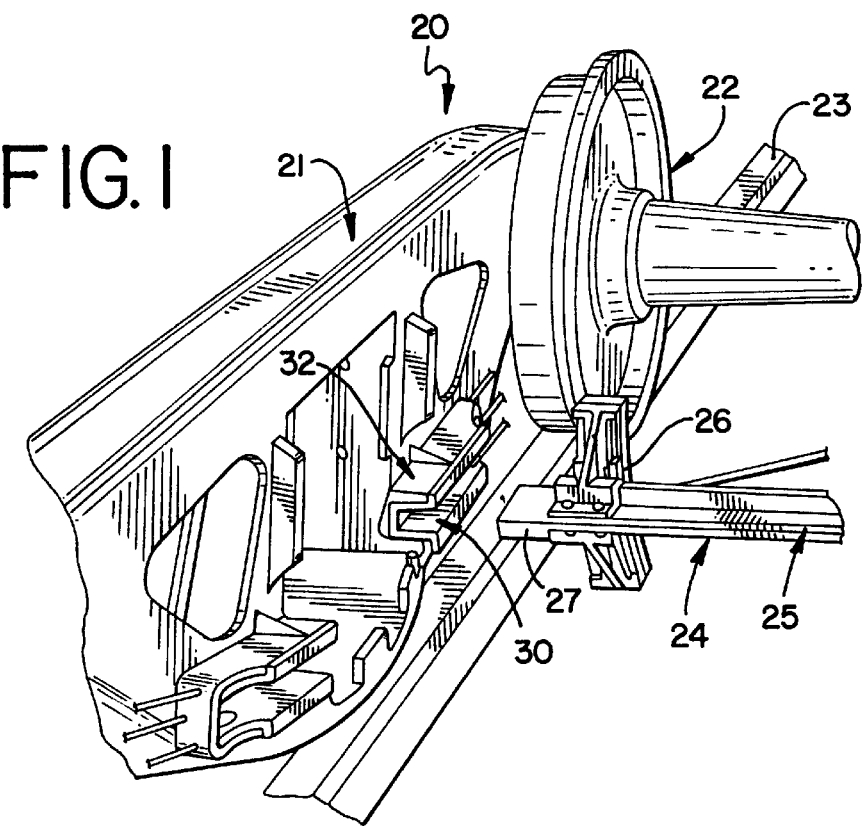
FIG. 1 is a fragmentary and partially exploded view of a car truck of a railroad car.
Figure 2:
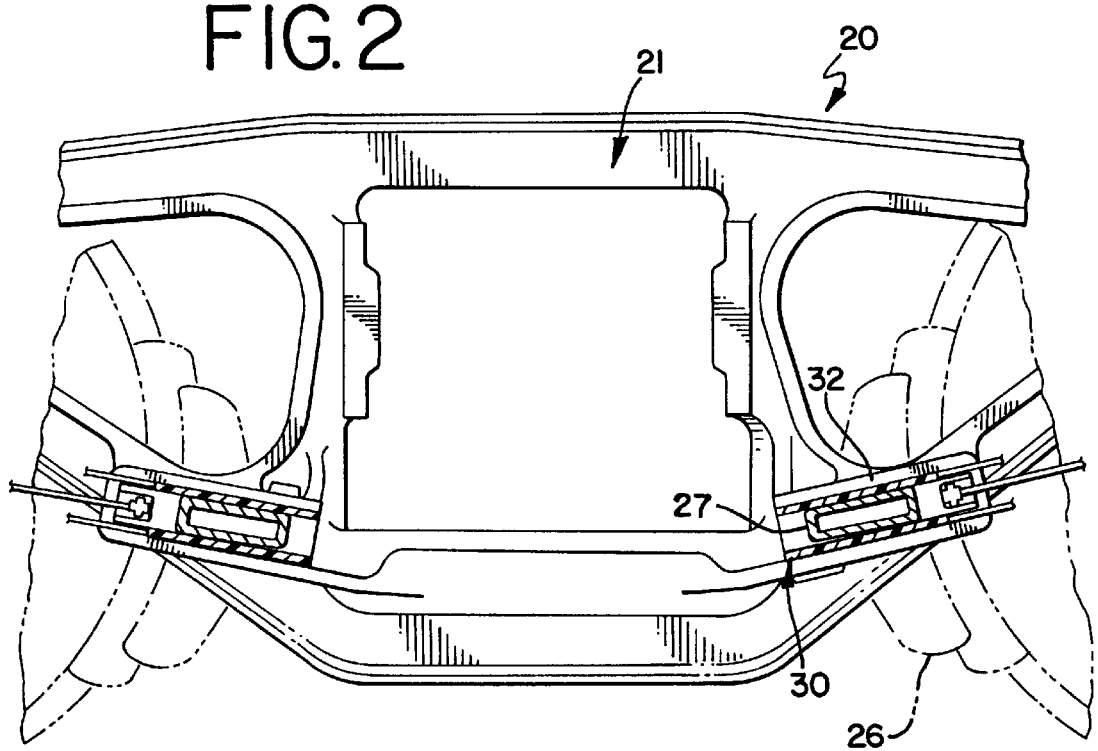
FIG. 2 is a vertical sectional view through the brake beam wear plates at one side frame and showing a fragmentary view of the side frame to illustrate the brake beam lugs in operation with the brake beam wear plates.

Referring now to the drawings, and particularly to FIGS. 1 and 2, a partial car truck 20 is shown which includes a side frame 21, a wheel and axle 22 associated with the side frame and with the wheel received on a rail 23, and a partial braking system 24. The brake system includes a brake beam 25 having brake shoes 26 mounted at each end for engagement with the wheels and guide lugs 27 at each end of the brake beams which are received in brake beam wear or guide plates 30 held in guide brackets 32 that are usually integrally formed with the side frames 21. The side frames are an unsprung part of a truck unlike the bolster. As seen particularly in FIG. 2, the brake beam lugs are received in the slideway of the brake beam wear plates.

The wear plates are made of a suitable plastic and generally U-shaped in cross section and, as seen in FIGS. 3 to 6, include opposed side walls 34 and 35 interconnected by a bottom wall 36. Before the wear plate is installed in a guide bracket, the opposed walls divergedly extend from the bottom wall, while after installation the side walls become parallel to each other. At the upper ends of the side walls 34 and 35, flanges 37 and 38 provide additional strength to the side walls and serve to overlie the ends of the side walls of the brackets 32. It will be appreciated that plastic wear plates are well known, as generally shown in U.S. Pat. No. 4,471,857. However, the wear plate used according to the invention is sized to provide a slideway that will produce a sloppy fit with the end lugs of the brake beam, as particularly illustrated in FIGS. 2 and 7, unlike the tight-fitting relationship illustrated in the U.S. Pat. No. 4,471,857.

The present invention involves the mounting of signal generating devices on the brake beam wear plate that may be connected to a computer for receiving movement signals from the car truck. More particularly, the signal generating devices are sensitive to vertical, transverse and/or longitudinal movements of the car truck so that movement signals can be received by the computer on the car and translated into usable information for conducting maintenance or adjusting train operation to enhance the life of the car. The sensing devices may be molded into the plastic wear plate or mounted on the wear plate subsequent to molding of the wear plate so that the devices are integral with the wear plate and will always be subjected to the same movement forces as the wear plate. As seen in FIGS. 3 to 7, sensing devices 40, 41 and 42 are respectively mounted in the side and bottom walls of the wear plate. In this embodiment, the side and bottom walls are molded with recesses 44, 45 and 46 for receiving the sensing devices. The recesses or pockets 44 to 46 are formed to receive and have mounted therein the sensing devices 40 to 42, preferably so they are flush with the inner surfaces of the side walls. It will be appreciated that the sensing devices are mounted at the end of the brake beam wear plate that will not be engaged by the brake beam lug as it moves along the slideway of the wear plate, as particularly shown in FIG. 3 in solid and dotted lines. Thus, the devices will not be damaged by the brake beam lugs. The sensing devices 40 to 42 are single axis devices which thereby sense movement along either the vertical, transverse or longitudinal axis of the car. Preferably, these sensing devices are accelerometers of a type such as sold by Kistler Instrument Corporation. These accelerometers provide a high level output signal with excellent long term stability. By producing electrical signals proportional to the acceleration of the device, that electrical signal can be translated by a computer to determine whether or not the movement is within acceptable values. As shown in FIG. 8, the sensing devices 40 to 42 are connected to a central processing unit or microprocessor 50 which would be mounted on the car and most likely used in connection with an electronically controlled pneumatic (ECP) braking system.

Accordingly, each of the sensing devices will be chosen for detecting one of the vertical, transverse or longitudinal movements of the car truck. As previously mentioned, slid-flat wheels and rail defects can be detected by vertical movements; truck hunting phenomena can be detected by transverse movements; and draft gear movements can be detected by longitudinal impacts or movements. With respect to detecting rail defects, such as spaces between adjacent inline rail sections or broken rails, detection of successive cars can pinpoint defects and their location.

Another form of the invention is shown in FIGS. 9 to 11, wherein a single sensing device 54 is mounted on the bottom wall 36 of the wear plate 30A. While the sensing devices in the embodiment of FIGS. 3 to 8 are substantially flush with the inner surfaces of the side and bottom walls of the wear plate in that embodiment, the sensing device 54 in FIGS. 9 and 10 is mounted on the bottom wall and between the opposed side walls 34 and 35. This is accomplished by means of a stud 56 that is molded into the bottom wall as illustrated particularly in FIG. 10, after which the sensing device is threadedly secured to the stud following the molding operation. This sensing device is also preferably in the form of an accelerometer that would be capable of providing outputs for each of the vertical, transverse and longitudinal axes to a CPU or microprocessor 58. Other than comprising only a single sensing unit, the same operation would be produced as in the embodiment of FIGS. 3 to 8 in that there would be three movement outputs sensed by the accelerometer 54 transmitted to the computer 58. Again, the sensing device 54 would be mounted at the end of the wear plate 30A that would not be subjected to use by the brake beam lug of the braking system.

It will be understood that modifications and variations may be effected without departing from the scope of the novel concepts of the present invention, but it is understood that this application is to be limited only by the scope of the appended claims.

The invention is hereby claimed as follows:

1. In a brake beam wear plate for a brake beam guide bracket on the inner side of a side frame of a railroad car truck including at least one axle carrying a pair of wheels,
   wherein the bracket includes an elongated pocket for supporting a brake beam of a brake system and said brake beam includes brake shoes mounted in alignment with the wheels,
   said wear plate comprising a molded U-shaped body of polymer material having spaced apart upper and lower side walls and an interconnecting wall,
   said side walls and interconnecting wall adapted to fit in said bracket pocket and define a slideway for an end of the brake beam,
   the improvement in means for monitoring car performance which comprises a computer and means mounted on said wear plate for sending signals to the computer indicating vertical, transverse and/or longitudinal car truck movements.

2. The combination of claim 1, wherein the monitoring means comprises accelerometer means.

3. The combination of claim 2, wherein the acceleration means further comprises at least one single axis accelerometer.

4. The combination of claim 2, wherein the accelerometer means further comprises a plurality of single axis accelerometers.

5. The combination of claim 2, wherein the accelerometer means further comprises a multiple axis accelerometer.

6. The combination of claim 2, wherein the accelerometer means further comprises a triple axis accelerometer.

7. The combination of claim 3, wherein the accelerometer is integrally molded in the wear plate.

8. The combination of claim 3, wherein said wear plate includes a mounting means at least partially molded thereinto on which a multiple axis accelerometer is mounted and fits substantially entirely within said bracket pocket.

9. In a railroad car including a car body, at least one truck supporting said body, said truck including side frames, wheeled truck axles and a braking system, said system including transversely extending brake beams having guide members at their ends, guide brackets in said side frames on the inner sides thereof, plastic brake beam guides received in the guide brackets defining slideways for said brake beam guide members, and a computer carried on the car, the improvement in means mounted on at least one of said brake beam guides for monitoring car performance, said means comprising an accelerometer carried by said guide and connected to said computer, said accelerometer detecting in/out, vertical and/or horizontal motion of said truck.

10. The combination of claim 9, wherein the accelerometer is a single axis device.

11. The combination of claim 9, wherein the accelerometer is a multiple axis device.

12. In a brake beam wear plate for a brake beam guide bracket on the inner side of a side frame of a railroad car truck including at least one axle carrying a pair of wheels,
   wherein the bracket includes an elongated pocket for supporting a brake beam of a brake system and said brake beam includes brake shoes mounted in alignment with the wheels,
   said wear plate comprising a molded U-shaped body of polymer material having spaced apart upper and lower side walls and an interconnecting wall, said side walls and interconnecting wall adapted to fit in said bracket pocket and define a slideway for an end of the brake beam, the improvement in means for monitoring car performance which comprises a computer and means mounted on said wear plate for sending signals to the computer indicating at least one of the vertical, transverse or longitudinal movements.

13. The combination of claim 12, wherein said indicating means indicates each of the vertical, transverse or longitudinal movements.

14. The combination of claim 12, wherein the indicating means comprises an accelerometer.

* * * * *